United States Patent
Lebaschi et al.

(10) Patent No.: US 8,960,547 B2
(45) Date of Patent: Feb. 24, 2015

(54) DOCUMENT SCANNER WITH INSTANT RETRIEVAL PROCESS

(75) Inventors: Ali Lebaschi, San Diego, CA (US); Haksoo Kim, San Diego, CA (US); Chung Yong Suh, San Diego, CA (US)

(73) Assignee: E-Seek, Inc., San Diego, CA (US)

( * ) Notice: Subject to any disclaimer, the term of this patent is extended or adjusted under 35 U.S.C. 154(b) by 194 days.

(21) Appl. No.: 13/487,039

(22) Filed: Jun. 1, 2012

(65) Prior Publication Data

US 2013/0134219 A1 May 30, 2013

Related U.S. Application Data

(63) Continuation-in-part of application No. 13/478,048, filed on May 22, 2012, now Pat. No. 8,833,658, which is a continuation-in-part of application No. 12/156,100, filed on May 28, 2008, now Pat. No. 8,181,872.

(60) Provisional application No. 60/994,612, filed on Sep. 19, 2007.

(51) Int. Cl.
| | | |
|---|---|---|
| *G06K 7/14* | (2006.01) | |
| *G06K 7/01* | (2006.01) | |
| *G06K 7/00* | (2006.01) | |
| *G06K 7/10* | (2006.01) | |

(52) U.S. Cl.
CPC ................ *G06K 7/01* (2013.01); *G06K 7/0004* (2013.01); *G06K 7/10831* (2013.01); *G06K 7/10851* (2013.01)
USPC .......................................... 235/454; 235/449

(58) Field of Classification Search
CPC ........... G06K 7/14; G06K 7/08; G06K 7/082; G06K 7/084; G06K 13/08; G06K 19/06187; G06K 19/12; G07D 7/04; H04N 1/1008
USPC .......... 235/454, 449, 475–483, 493; 358/496, 358/474, 505; 382/318, 320
See application file for complete search history.

(56) References Cited

U.S. PATENT DOCUMENTS

| | | | | |
|---|---|---|---|---|
| 5,854,965 | A * | 12/1998 | Kasiwabara et al. | ......... 399/381 |
| 6,802,452 | B2 | 10/2004 | Lebaschi et al. | |
| 7,131,592 | B2 | 11/2006 | Lebaschi et al. | |
| 7,505,928 | B2 | 3/2009 | Lebaschi | |
| 8,181,872 | B2 | 5/2012 | Lebaschi | |
| 2004/0028266 | A1* | 2/2004 | Jones et al. | ................... 382/135 |
| 2006/0176524 | A1* | 8/2006 | Willrich | ....................... 358/474 |
| 2010/0128924 | A1 | 5/2010 | Rhoads | |
| 2011/0242617 | A1 | 10/2011 | King et al. | |

* cited by examiner

*Primary Examiner* — Kristy A Haupt
(74) *Attorney, Agent, or Firm* — Lewis Kohn & Walker LLP; David M. Kohn; Kari Moyer-Henry

(57) ABSTRACT

An improved document scanner for imaging documents and decoding coded indicia such as bar codes and magnetic strips is disclosed. In a preferred embodiment, the scanner incorporates a set of emergency exit instructions so that a user can always retrieve sensitive documents at a moment's notice. These instructions include receiving an emergency exit command from a jamming sensor or from the user, and then attempting mechanical translation toward a first exit and further subsequent translation toward a second exit. If the document is not successfully retrieved, the scanner prepares for manual document extraction as detailed herein.

20 Claims, 13 Drawing Sheets

DOCUMENT SCANNER WITH INSTANT RETRIEVAL PROCESS

PRIORITY CLAIM

This patent application is a continuation-in-part of U.S. patent application Ser. No. 13/478,048 filed May 22, 2012, now U.S. Pat. No. 8,833,658 entitled "Multi-Pass Document Scanner and Multi-Pass scanning Method, that is further a continuation-in-part of U.S. patent application Ser. No. 12/156,100 filed May 28, 2008, U.S. Pat. No. 8,181,872 entitled "Imaging Device And Method for Concurrent Imaging of Opposite Sides of An Identification Card or Document," which in turn claims priority from U.S. Prov. Pat. App. Ser. No. 60/994,612 filed on Sep. 19, 2007, and the present application claims the benefit of the priority date thereof; accordingly the entire contents of these two non-provisional patent applications and one provisional patent application are hereby expressly incorporated herein by reference. The present application also expressly incorporates U.S. patent application Ser. No. 13/405,064 entitled "ID Scanner with Machine-Readable Coded Indicia Reader and Card Imaging Digital Camera" by reference.

BACKGROUND OF THE INVENTION

1. Field of the Invention

The present invention relates to a document scanner with the capability of electronically imaging and scanning multiple forms of coded data from an ID card. More particularly, the invention pertains to an improved ID scanning device and method particularly useful for extracting an ID card that has jammed within the device.

2. Description of the Prior Art

Subsequent to recent heightened security, government and private security measures have continued to increase worldwide. Consequently, there is a continued need for business and government security personnel to inspect the identification cards of employees and citizens to verify identity and to ascertain their authenticity and scope. Further, bars, nightclubs and liquor stores that serve alcohol risk hefty fines and loss of their liquor licenses should they serve alcohol or tobacco to underage customers. Because the risks are so high, both in terms of government security and government punishment, inspecting and validating customer identification cards has risen to critical importance.

However, with constant improvements in home computers and high definition color printers, forging and manufacturing false identification (ID) cards, passports, employment identification cards, and drivers' licenses and the like has become easier. A decade ago, an apparently authentic driver's license forgery could be crafted by cutting and pasting photographs onto a printed card before laminating the combination. Modern ID cards have many more authentication and security measures in place, but visually convincing forgeries can still be crafted with modern computers and printers and appropriate graphic software. Further however, while the forgery may appear genuine to the human eye, these impostors can still be quickly and easily identified with a proper ID scanner, analyzing the card under infrared (IR) or ultraviolet (UV) light.

As the technology to produce forgeries and the penalties for failing to identify fraudulent IDs both increase, there is an increasing demand on business owners, bar and liquor store owners, banks, and government employees such as the Transportation Security Administration (TSA), to quickly read, record, and authenticate a presented piece of identification. In the past decade, drivers' licenses have evolved to include many new types of security and authenticity factors which are imprinted directly onto the identification card. Examples include fluorescent inks, inks visible under only certain light spectra, hidden indicia in identification photos, printed bar codes, and magnetic strips which are encoded. Frequently a plurality of these security and authenticity measures are imprinted on either side of a driver's license or ID and can serve to validate that the ID is current and can authenticate the ID as validly issued rather than forged.

Nonetheless presently, most small businesses such as bars or restaurants do not have the personnel trained to quickly and accurately identify forgeries through comparison of imprinted authenticity and validity markers. Further, because the equipment to read and discern the various security features can often be both bulky and expensive, business and even government venues do not regularly employ them. Instead, businesses and government employees rely on the eye of a bouncer or gatekeeper at the restaurant or bar, and government relies on personnel such as a counter clerk or TSA agent, both of whom with little training and less equipment must try and spot forged identifications without the aid of variable light wavelengths and magnetic and optical strip readers and comparison of duplicate information on each.

One major impediment in imaging and detecting the authenticity and current validity of drivers' licenses and identification cards using conventional scanning machinery is the fact that they are stiff by nature due to their need for longevity. Most two sided document readers and imagers depend on running the document being scanned through a serpentine path in the device on a track through curves and ejecting it at the end of the serpentine path. While traversing this path, the card is optically viewed in a number of positions to try and image spectrum viewable security features for comparison. Being short and stiff, such cards are not well adapted to follow the conventional serpentine path required for imaging two sides. Further, such card readers tend to be very bulky due to the elaborate pathways the card must follow and the different multiple imaging stations along the path. Adding to the problem with such conventional imaging devices is that using multiple digital imaging chips (for example CCD's and CMOS-style) in one device can greatly increase the expense. Consequently employing two digital imaging chips to image both sides of a document doubles the cost. Additionally two independent image capturing components require a doubling of calibration, lighting, and the number of things that can malfunction in the device.

Accordingly, there is an unmet need for an imaging device that will scan both sides of either a flexible or relatively stiff identification card such as a driver's license or credit card style ID, which has a reduced size and footprint in use at such venues as an airport, bar, or company or government building point of entry. Such a device should provide for imaging of both sides of the card or document concurrently by a single electronic imaging device to thereby reduce costs and initial and ongoing calibration requirements. Such a device, due to the nature of people standing in lines and crowds where the identification is generally checked, and credit cards employed, should serve to increase speed through a checkpoint rather than slowing it as is the result with conventional devices. Further, such a device should eliminate the serpentine path for the document being checked and should provide the shortest and fastest path in and out of the device as is possible while achieving concurrent images of both sides of the document under a plurality of illumination spectrums required to image authenticity markings Still further, such a device should be especially well adapted to image both sides of a driver's license or ID card concurrently in a highly registered imaging between the two sides and to produce images that are easily readable and comparable on a video display for the user.

Because some user systems require information extracted from the machine-readable indicia as well as an image of the card, there is a need for a system capable of reading machine-readable indicia from an ID card as well as photographing the surface of the ID card in a single, compact package. The most convenient embodiment for checking modern ID cards would incorporate a magnetic strip reader alongside a digital camera. With this combination of coded indicia readers, a vendor or security personnel would be able to simply extract data from many ID cards, including any state driver's license issued in recent years.

Additionally, there is a benefit in scanning an ID card or document during multiple passes along an internal defined path. Different scanning devices could require different pass speeds and engaging certain scanners simultaneously could interfere with the quality provided by other scanners. For example, ID cards require a minimum pass velocity to energize a magnetic coil and read a magnetic strip, and this minimum magnetic strip velocity only narrowly overlaps with the maximum digital image capture velocity. Additionally, it would be impossible to simultaneously capture images of an ID card under multiple different lighting conditions, such as infrared, ultraviolet, and RGB (visible), as the sensor would pick up all of the reflected light rather than the specific desired frequency. It is possible to alternate two 2 frequencies of illumination during a single pass, but if more than two frequency captures are desired, an additional pass by the sensors could lower the illumination intensity or precise timing requirements. To allow optimal performance of all included scanners, more than one pass by the scanner assembly can be quite beneficial.

Also in light of the above, it is an additional object of the present invention to provide a device combining three popular machine-readable data options (e.g. magnetic strip, 2-D barcode, and RFID tags) and related variations, and further thereby providing an all-in-one peripheral for reading information from virtually any type of ID card, increasing both security and convenience in a smaller, cheaper package.

It is still further and object of the present invention to provide a scanning device and method with a particular configuration suited for retrieving a jammed document of identification (ID) card.

SUMMARY OF THE INVENTION

The disclosed device and method herein employs unique optics which enables it to employ a very short and unique flow path for documents such as drivers' licenses and identification cards and other identification documents in and out of the device. During this short flowpath through the device, a plurality of light spectrums are sequentially reflected off of both sides of the inserted ID to provide a means to easily image and ascertain the existence of any hidden indicia and security features which must be checked to ascertain document authenticity and current validity. A mechanism employing an electric motor and wheels provides for automatic movement into and out of the device during a scan. Employing a short and inline flowpath for the ID or document inserted and unique lighting, optical reflections and imagers allow for insertion and removal of the ID or document from a single slot in the reader device. Employing software adapted to ascertaining ID or document validity and authenticity by one or a combination of magnetic stripe scanning, optical character recognition, and sequential light spectrum illumination to determine presence and proper location of hidden markers can provide a valuable automation to the process of checking such documents. The sequential illumination can include: the visible spectrum (white light), specific visible frequencies (red, green, blue, etc. . . . ), ultraviolet light to illuminate holograms, or infrared light to determine paper or ink chemical composition. Arranging the unique optical assembly, magnetic strip reader, and light spectrum illumination along a short flowpath allows for a device with a very small footprint and can therefore be deployed at inspection stations or entries where space is limited.

As shown in the drawings and described herein, the disclosed device is a self-contained peripheral unit designed to capture and process the images of both sides of a driver's license, credit card, employment ID card, or similar card style identification card. The device also has the ability to image and read 2D or 1D bar codes frequently encoded on such ID cards with verification information and can also read encoded magnetic strip data for age verification and/or authentication of the ID and holder.

In operation, images of both sides of the inserted document or card are concurrently captured to memory and then internally processed. This allows the information to become immediately available for further verification of the ID itself and matching it to the person presenting it.

The device additionally employs a unique scanning and imaging technology enabling it to capture images of both sides of the ID, card, or document inserted by employing a number of different light sources sequentially. This enables the system not only to read visible informational indicia such as barcode and texts and photos, but also allows the device to discern hidden authentication indicia being employed on such documents.

The process of validating the ID is accomplished by comparing one or more specific recognized features of the ID card or document inserted which only appear visible for capture under a specific light source. The light sources present in the device project light in sequential frequencies or spectrums for example including UV (365 nm), Blue (470 nm), Green (525 nm), Red (625 nm), IR (850 nm), and white. The frequencies listed are demonstrative only and the device and invention is not restricted to only those frequencies or those bands of light. Employing these individual light spectrums in a novel sequential lighting arrangement also allows concurrent illumination should combinations of the spectrum be required or white light to capture more accurate visible colors. Thus colored renditions can be assembled electronically from the light reflected at the various wavelengths. This accuracy of color reproduction further enhances the processes validating and authenticating ID's and documents in that it allows for watermark and Original-Color-Print detection. Additionally, by illuminating with infrared light as well as under a number of other frequencies, chemical composition can be accurately determined to further verify an ID or document source. Using onboard or networked information for comparison, the current validity of the identification in the case of expiring documents and the authenticity in the case of valid issuance, as well as matching it to the presenter, can be handled at a very fine level.

In addition to employing LEDs to project individual light sources for concurrent or sequential imaging, a unique optical path design enables the device to capture the entire portion of both sides of the ID or document such as a state driver's license, employing only a single optical sensor (CCD) to digitize the captured images. Employing the unique reflective path allowing for this single CCD not only reduces the system cost but also allows for easy calibration for image comparison of both sides of a document since all images are captured from the same position rather than multiple image sensors at multiple points as in conventional devices. Capturing both sides with an image reflection also reduces the required optical focal length, leading to greatly reduced device dimensions.

In addition to onboard microprocessor, memory, and optical components, the device has means for communication with a computer network using either wireless or wired ports. Power can be supplied by onboard batteries or by an AC adapter.

Practitioners of ordinary skill in the art will appreciate that the conception upon which the imaging device and method are based may readily be utilized as a basis for designing of other one-sided or two-sided imaging systems for carrying out the several purposes of the present invention. It is important, therefore, that the claims be regarded as including such equivalent construction insofar as they do not depart from the spirit and scope of the present invention.

It is an additional object of this invention to provide a driver's license or similar identification document reader which can ascertain the authenticity of the document inserted using a single imager and short linear flowpath for the document into and out of the device.

It is further an object of the invention to provide such a device for imaging two sides of a driver's license or identification card or document, which employs a single imaging point and one imager to capture all images of both sides in order to reduce cost and calibration requirements.

It is yet further an object of this invention to employ a plurality of specific wavelengths of light inside a housing for lighting the surface to be imaged to allow the imager to process images from an inserted document thereby, using multiple images under one or a plurality of light wavelengths to ascertain hidden authentication features.

These together with other objects and advantages which will become subsequently apparent reside in the details of the construction and method as more fully hereinafter described and claimed, reference being had to the accompanying drawings forming a part thereof, wherein like numerals refer to like parts throughout.

More specifically the invention in a first aspect is a document scanner for extracting identifying information comprising: a defined path in which a document can be mechanically translated, said defined path having a first opening in an external housing and a second opening in said external housing opposite said first opening; a sensor array area enclosing a portion of said defined path; a motor or actuator capable of mechanically translating a document both in a first direction along said defined path and in a second direction opposite to said first direction along said defined path; an access door in the external housing that opens to allow access to a document inside of said external housing; and a processor in communication with a memory, the processor capable of executing an automated document extraction process. The automated document extraction process herein comprises receiving an emergency exit command; instructing said motor or actuator to mechanically translate said document along said defined path toward said first opening; instructing said motor or actuator to mechanically translate said document in a reverse direction along said defined path toward said second opening; and preparing said document scanner for manual document extraction by a user.

The document scanner herein is additionally characterized as comprising a digital camera having a lens and a sensor array for acquiring at least one image of a side surface of the document; and a magnetic strip reader. Regarding the document extraction process, included is the step preparing the document scanner for manual document extraction including illuminating a notification light that manual document extraction is required.

The invention in this aspect is additionally characterized wherein the sensor array includes at least one retractable element and the preparing said document scanner for manual document extraction includes the step of retracting the at least one retractable element. Also further, the access door herein includes a manual release access trigger. The document scanner herein is further characterized in the process of preparing the document scanner for manual extraction by a user includes reducing power supplied to internal components and automatically opening the access door.

The document scanner herein is additionally characterized wherein the portion of the defined path enclosed by the sensor array area is no longer than the length of the document to be scanned. The retrieval process herein is also further characterized wherein the instructing the motor or actuator to mechanically translate the document along said defined path toward said first opening comprises mechanically translating at an intermittent rate. The retrieval process herein is more specifically explained wherein the instructing the motor or actuator to mechanically translate the document along the defined path toward the first opening comprises mechanically translating at a reduced speed. The invention herein also includes a button that sends said emergency exit command.

The document scanner in this aspect further comprises a sensor capable of automatically sending said emergency exit command if the document is jammed. Still further, the document scanner herein comprises a pair of mirrors, one each of the pair at an angled position adjacent to each of a respective one of the two opposing side surfaces of the document in the defined path; and a secondary mirror portioned transverse to the document and the defined path, the secondary mirror having an angle adapted to intersect reflections from both of the pair of mirrors and communicate them to the lens of the digital camera.

In a second aspect the invention may be characterized as an automated method for extracting a document from a document scanner comprising: receiving an emergency exit command; attempting to mechanically translate a document in a first direction along a defined path inside of an external housing toward a first access point; attempting to mechanically translate a document in a second direction opposite the first direction along the defined path inside of an external housing toward a second access point; preparing the document scanner for manual document extraction by a user; and illuminating a light that informs the user the document scanner was not capable of manually extracting the document.

The method in this aspect herein is additionally characterized as comprising the step of receiving a notification that a document somewhere along the defined path requires extraction from the document scanner. Also the method is more specifically characterized wherein the attempting to mechanically translate a document includes attempting to mechanically translate a document at an intermittent rate and/or optionally mechanically translating the document at a reduced speed. The method additionally includes the step of retracting a retractable element configured to the document.

In still another aspect, the invention is characterized as a document scanner for extracting identifying information comprising: a defined path in which a document can be mechanically translated, the defined path having a first opening in an external housing and a second opening in the external housing opposite the first opening; a sensor array area enclosing a portion of the defined path, the portion of the defined path enclosed by the sensor array area is no longer than the horizontal length of the document to be scanned; a motor or actuator capable of mechanically translating a document both in a first direction along the defined path and in a second direction opposite to the first direction along the defined path; an access door in the external housing that opens to allow access to a document inside of the external housing, the access door including a manual release access trigger; a digital camera comprising a lens and a sensor array for acquiring at least one image of a side surface of the document; a magnetic strip reader; and a processor in communication with a memory.

The invention is this aspect is further characterized in that the processor is capable of executing an automated document extraction process, the automated document extraction process comprising the steps of: receiving an emergency exit command; instructing the motor or actuator to mechanically translate the document along the defined path toward the first opening; instructing the motor or actuator to mechanically translate the document in a reverse direction along the defined path toward the second opening; and preparing the document scanner for manual document extraction by a user. Also in this aspect the invention includes a pair of mirrors, one each of the pair at an angled position adjacent to each of a respective one of the two opposing side surfaces of the document in the defined path; and a secondary mirror portioned transverse to the document and the defined path, the secondary mirror having an angle adapted to intersect reflections from both of the pair of mirrors and communicate them to the lens of the digital camera.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DETAILED DESCRIPTION OF PREFERRED EMBODIMENTS

Figure 1:
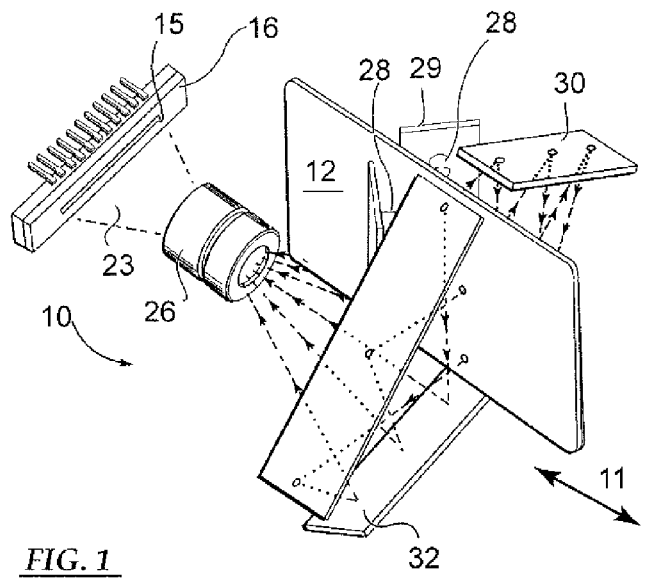
FIG. 1 is a perspective depiction of the internal workings of the optical system of the device employing mirrors to communicate both sides of a moving document to a single imaging device for capture.
Figure 2:
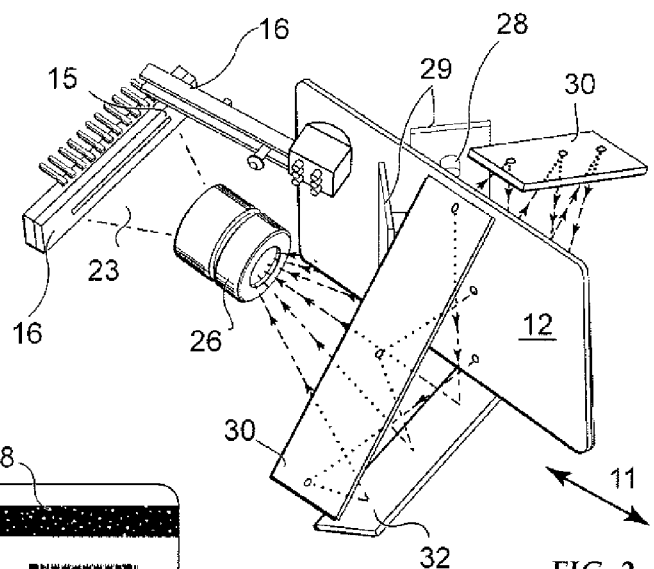
FIG. 2 shows the additional function of a magnetic strip reader which may be concurrently employed to read magnetic strip information and ascertain correct insertion.
Figure 8:
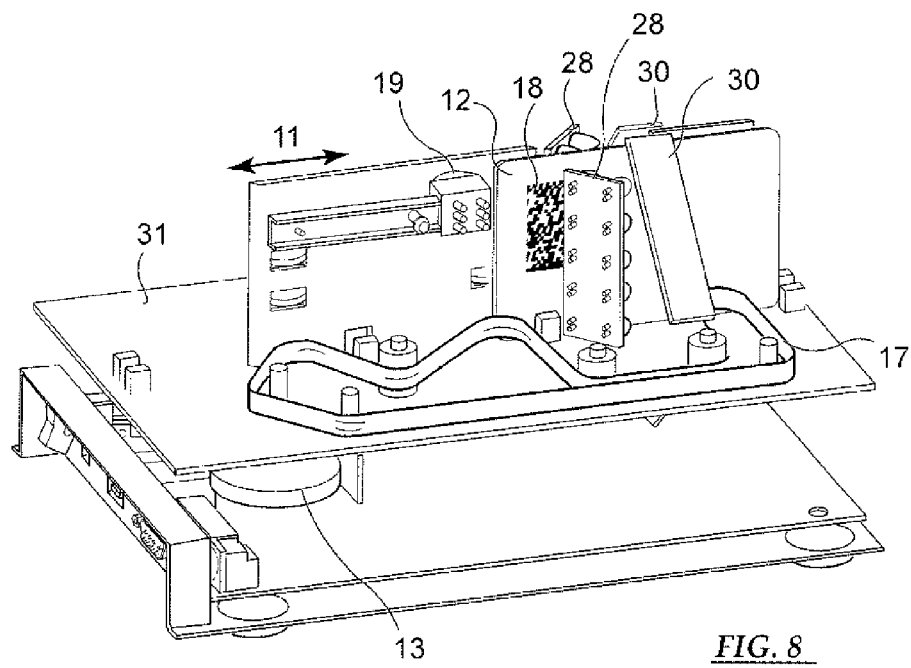
FIG. 8 shows the belt pulling the ID card translating it into and out of the linear flowpath above the imager.
Figure 9:
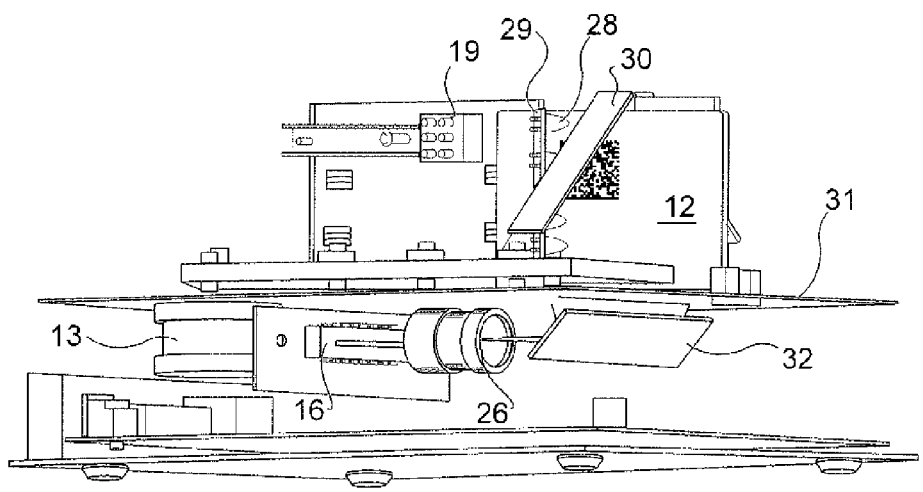
FIG. 9 depicts the final horizontal imaging mirror positioned inline with a lens focusing the segmental image of each side of the card to the imager.

Referring now to the drawings in FIGS. 1-16, exemplary preferred embodiments of the present invention in current preferred modes are shown and described. The device 10 as shown in FIG. 1 and other figures is adapted to be easily employed for imaging two-sided documents such ID type documents such as a driver's license card 12. Using a drive mechanism as shown in FIGS. 8-9 which employs a reversible motor 13 to drive a belt 17 to mechanically translate a card 12 along a linear flowpath 11 into and out of a housing 14; the device 10 offers easy review and authentication of presented identifications such as drivers' license card 12. The translation into and out of the housing 14 is timed to allow strobing of the individual LEDs 28 to illuminate the card 12 to capture segmented images during each such illumination of each LED 28 in each light frequency to thereby electronically assemble one or a plurality of different images of the card 12 in each respective spectrum of illumination employed.

In operation the card 12 or other two-sided document to be viewed and/or checked for authenticity and/or current validity as to expiration date, is inserted into and exited from an inline linear flowpath 11 inside a housing 14. The A drive mechanism 13, 17, 130 will translate the card 12 into and out of the housing 14 for a duration sufficient to illuminate the card 12 with the LEDs 28 and capture the necessary segments of card image to assemble an total image electronically of the card 12 under each spectrum, or combine the segments in one or a plurality of spectrums electronically, to yield an assembled image of the card 12 showing the different hidden and visible indicia combined. The assembled image of the card 12 thus can show the hidden indicia which only appears under certain light spectrums along with the visible indicia to allow for easy verification of the validity and authenticity of the card 12 when projected on a video monitor such as the depiction in FIG. 3 showing both sides of the card 12 concurrently as they are seen by the digital imager 16.

Figure 3:
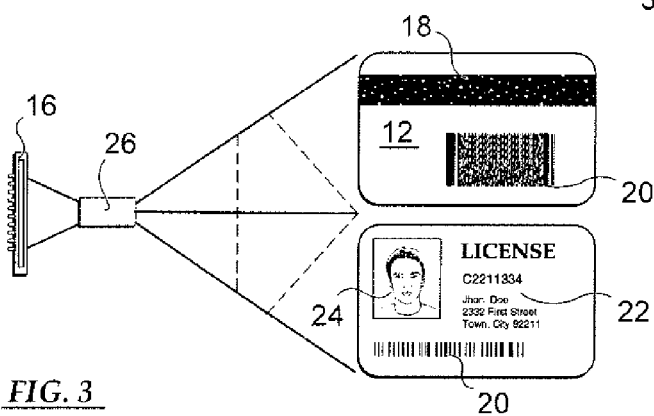
FIG. 3 is an expanded or unfolded field of view of the device without showing the mirrors employing dotted lines to show locations of the three mirrors which project concurrent images of both sides to the capturing device.

Inside the housing 14 the device 10 employs a unique combination of means for illumination and means for optical reflection allowing the use of a single imager 16 which enables a two-sided image to be captured concurrently by the imager 16 from assembled segments of images from the strobing LEDs 28 in their respective spectrum as shown in FIG. 3. The segments are sized as a function of the width of the mirrors employed.

During translation into and out of the device 10, both sides of an identification card 12 such as a driver's license or employment ID or other double sided document are concurrently captured by the imager 16 and thus the two images are registered with each other throughout the imaging process allowing for positions of indicia on each side to be compared with each other as another means to ascertain authenticity. Because of the short linear flowpath 11 allowed by the unique concurrent imaging of both sides, and the fact that the LEDs capturing segments of the assembled image can strobe both during the incoming and exiting movement of the card 12, a license or other inserted card 12 or ID only needs to move into the housing 14 a short distance, thereby allowing for a relatively small housing 14, shown in FIG. 5. Additionally providing for the small footprint is the placement of the imager 16, lens 26, and horizontal mirror 32 on one side of the circuit board 31 and the angled reflective mirrors 30 and linear flowpath 11 for the card 12 on the opposite side. This stacked arrangement of the components renders the device 10 much smaller than would be the case conventionally.

The electronic imager 16 such as a CCD chip, or other means to capture an illuminated image and convert it to a digital image, in addition to capturing segmented images of the card 12 surface under different light spectrums, has the ability to capture and digitize images of 2D or 1D bar codes 20, which are frequently encoded on such ID cards or licenses card 12 and/or ID such as company and government issued security cards. The captured bar codes may be processed by software adapted to the task to extract their data once captured. Optionally but preferred, the device 10 can also read an encoded magnetic strip 18 which frequently contains data about the holder and about the document on which it is placed, using a retractable 119 magnetic strip reader 19 in the proper position as shown in FIGS. 8-9. Both the optically readable bar code 20 and the magnetic strip 18 are used by many government and private agencies to encode hidden data and are thus employable to verify the indicia 22 such as text and photo 24 on the card 12 or other ID containing them.

Figure 4:
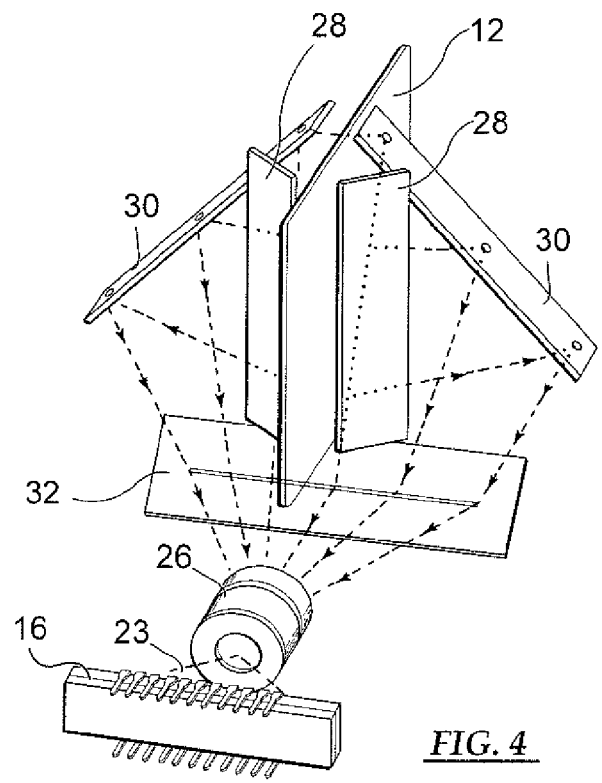
FIG. 4 is an end view of the unique optical arrangement of mirrors to reflect both sides of the ID card to a final mirror under the flowpath for capture by the imaging device mounted traverse to the flowpath.
Figure 5:
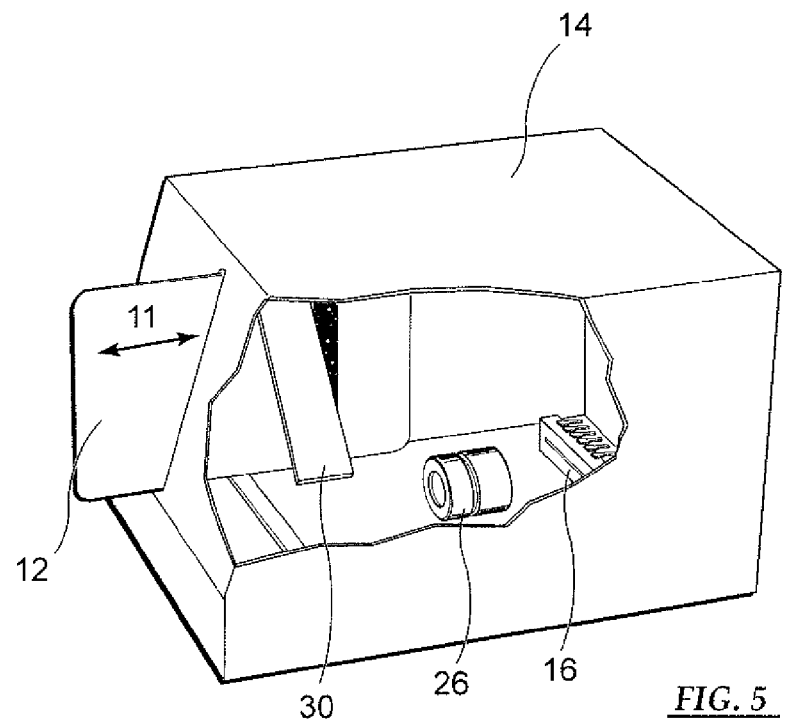
FIG. 5 shows a cutaway view of the housing which would surround the device and with the circuit board removed, and which darkens the flowpath and enables the employment of multiple individual LED or light source projections to capture different images of both sides of the card.
Figure 6:
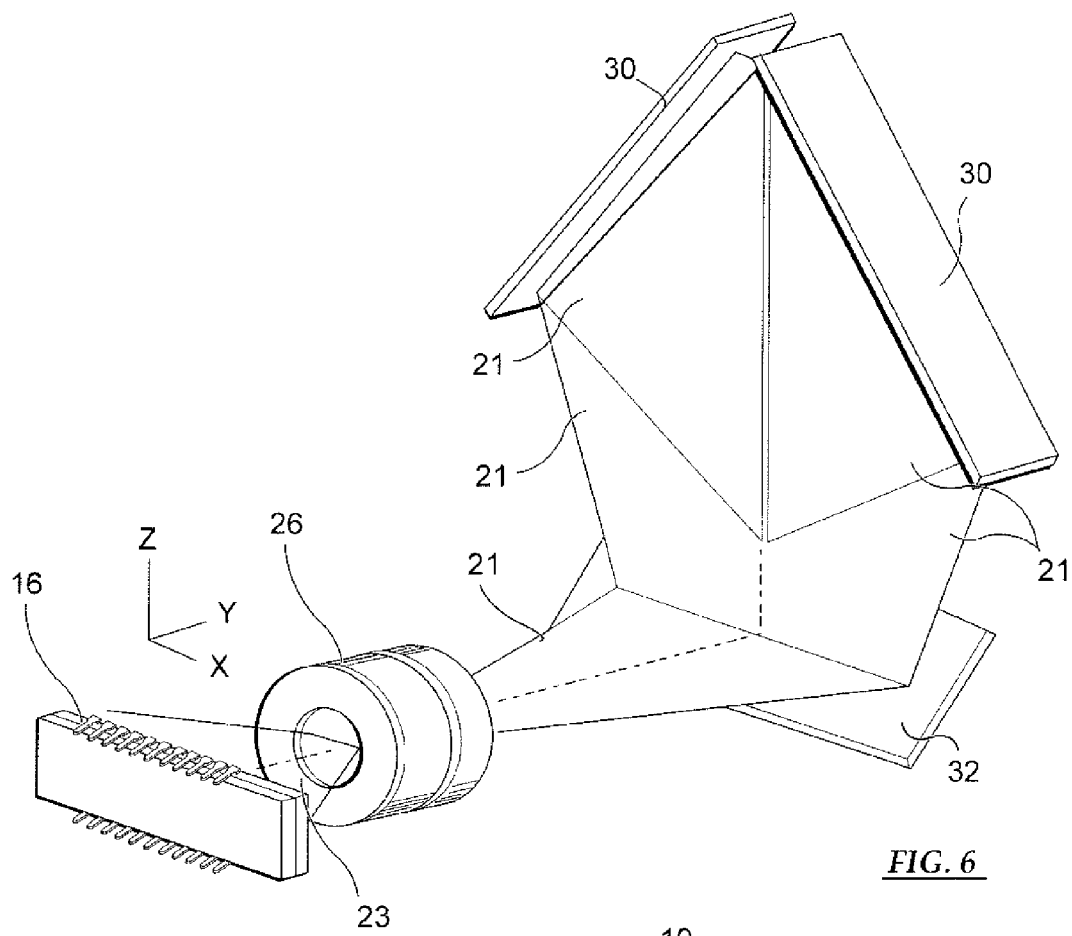
FIG. 6 is a rendition of the planar projections of the card surfaces in sections to a final horizontally disposed mirror reflecting sections through a refracting lens to the imager.
Figure 7:
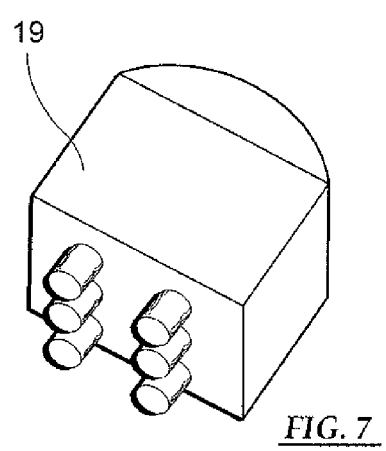
FIG. 7 depicts the magnetic strip reader.
Figure 10:
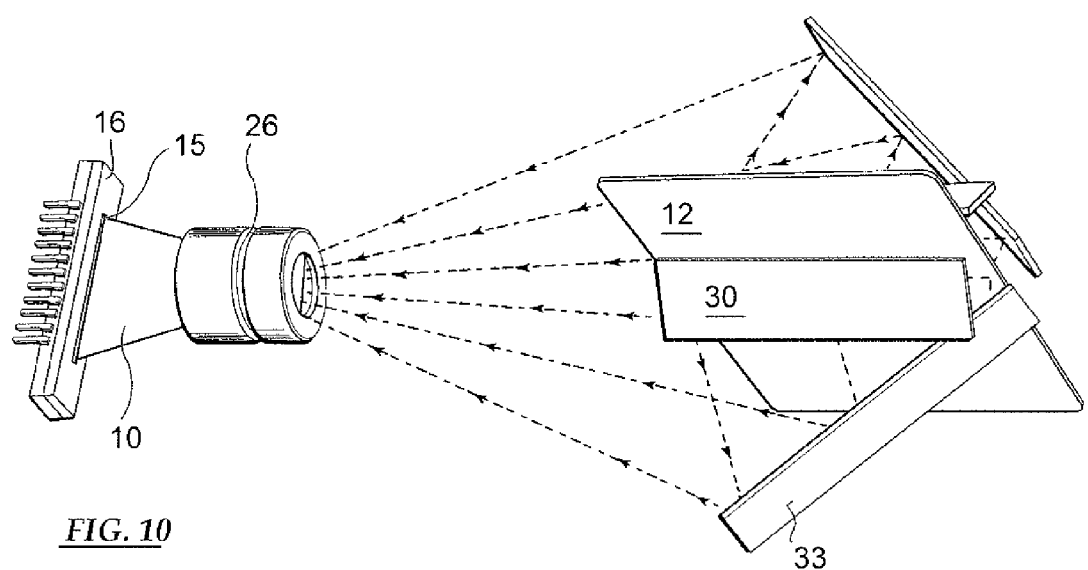
FIG. 10 depicts another means to concurrently communicate segments of both sides of the card to the imager during periods of illumination from that of FIGS. 4 and 6.
Figure 11A:
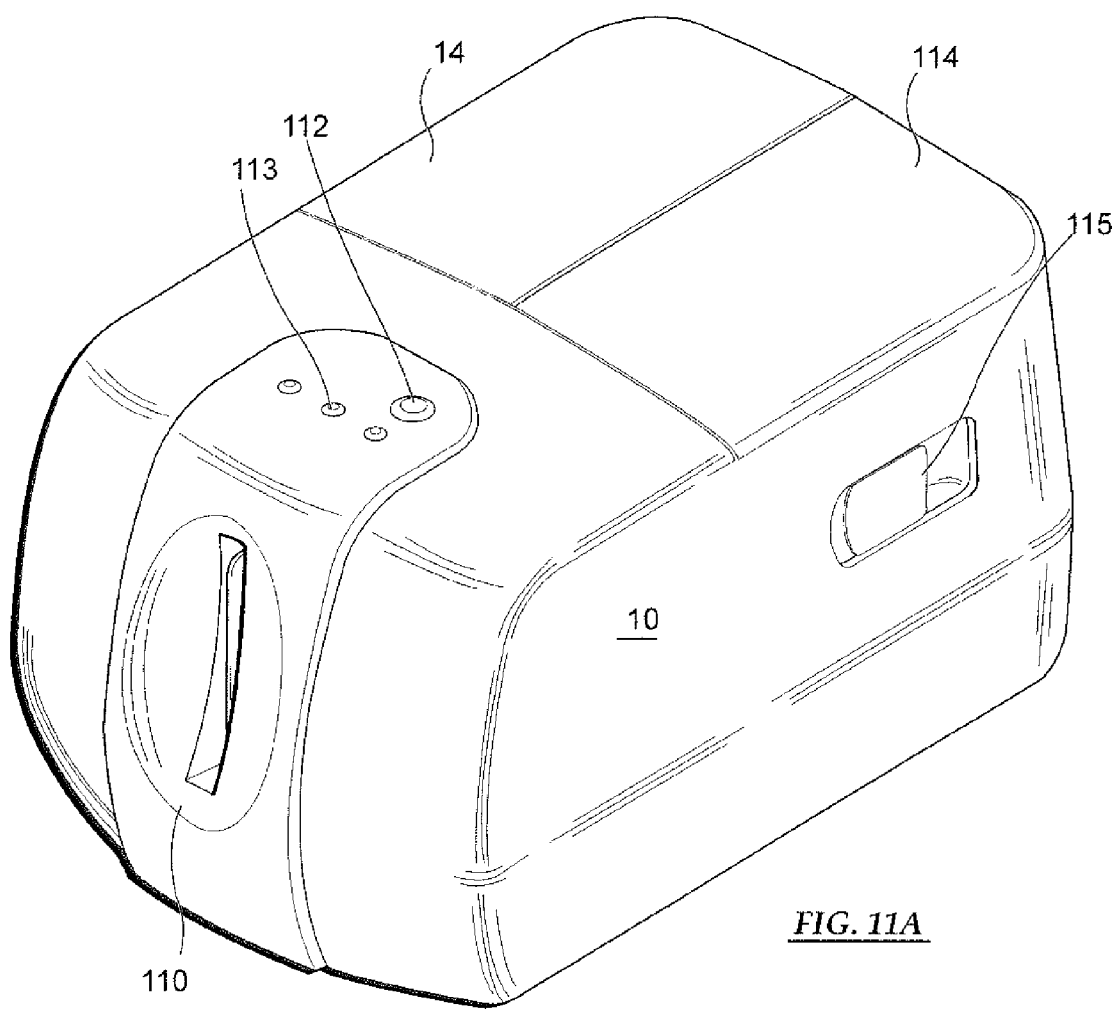
FIGS. 11A, 11B, and 11C depict exemplary illustrative views of the ID Scanner with the access panel in its closed state.
Figure 11B:
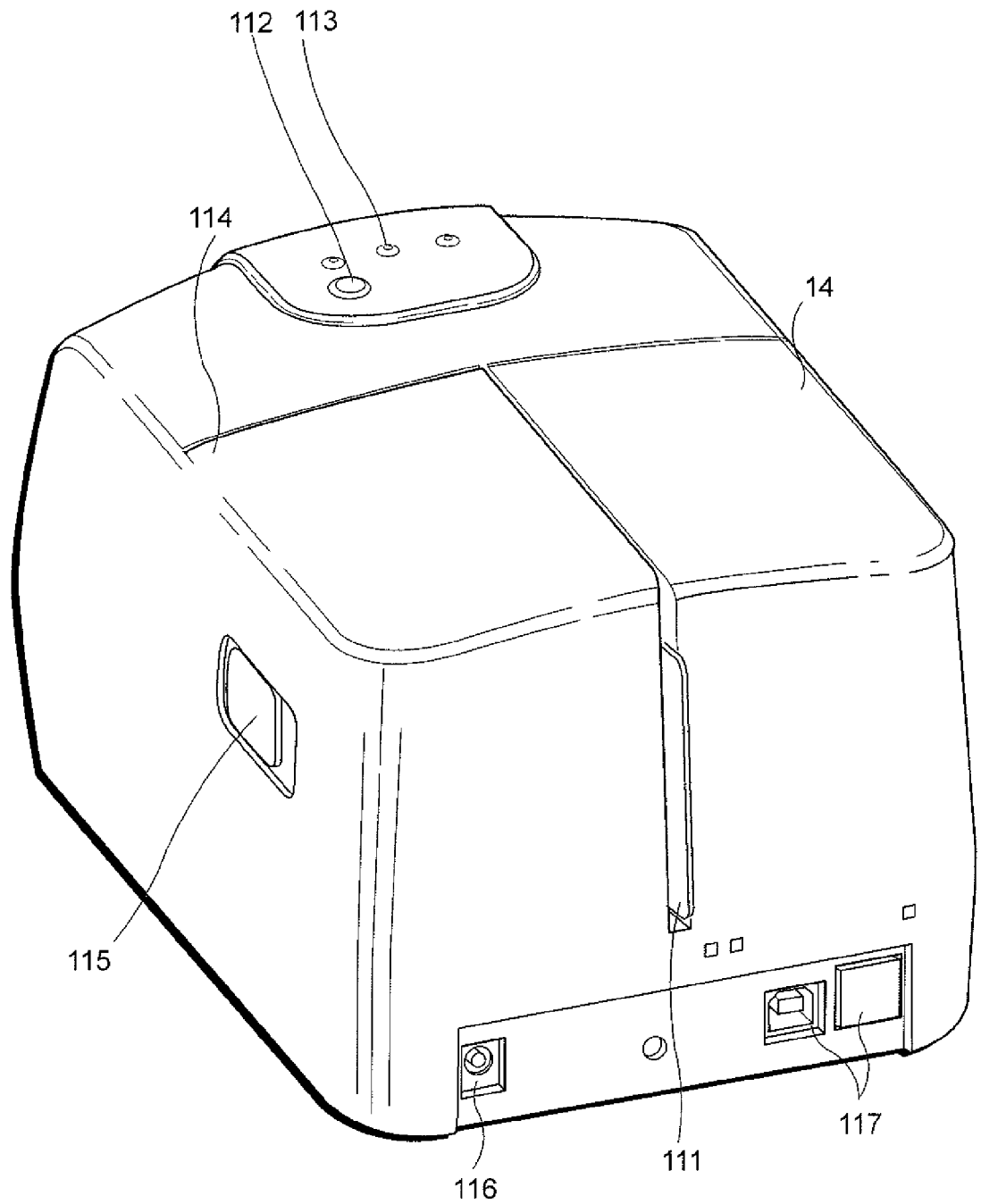
Figure 11C:
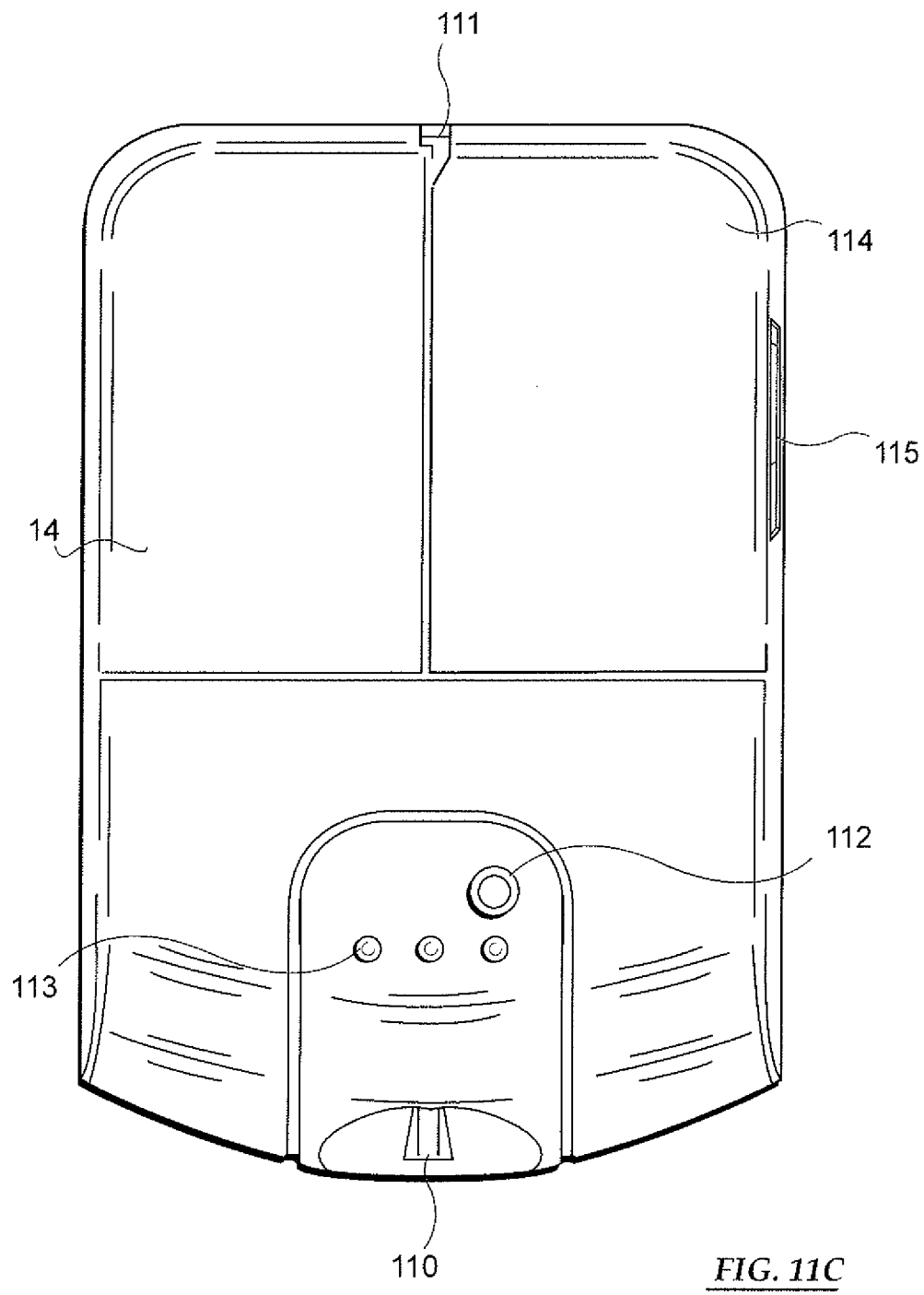

In operation, a two-sided image or concurrent individual images of both sides of a document such as an ID card 12 or license, or passport, as shown in FIG. 3, is assembled from segments communicated to and captured by the imager 16. As depicted in FIGS. 4 and 6 and 10, segments forming duel assembled images of the card 12, during capture traveling along the linear flowpath 11, are concurrently communicated to the imager 16 using means to reflect both sides concurrently into the lens 26 which focuses segments from both sides of the card 12 to assemble both images in each respective spectrum. The arrangement of components in FIGS. 4, 6, and 10, are a preferred means to communicate segmental images of both side surfaces of the card 12 upon the imager 16 during travel of the card 12 into and out of the housing 14. As shown in FIGS. 4 and 6, one especially preferred mode providing means to communicate segmented images of the two sides of the card 12 upon the imager 16 is provided by angled reflective mirrors 30 which communicate images of segmented portions of each side of the ID card 12 or license to a horizontal mirror 32 and through a lens 26, to the imager 16 in sequence. As the LEDs 28 strobe in their respective spectrum during passages along the flowpath, segmental images in each spectrum are communicated to the imager 16.

As depicted in FIG. 10 in another mode of the device 10, the angled reflective mirrors 30 may be positioned in other arrangements to communicate the segmental images to the imager 16. In FIG. 10, the angled reflective mirrors 30 are parallel to the linear translational linear flowpath 11 of the card 12 and reflect segmental images to two lower angled mirrors 33 which replace the horizontal mirror 32, as earlier embodiments. The lower angled mirrors 33 project the images though the lens 26 to the imager 16. Those skilled in the art will realize once educated by this specification that other means to concurrently communicate segmented portions of both sides of the translating card 12 to the imager 16 can be employed and such are anticipated. However, the current preferred mode employs the device 10 as depicted in FIGS. 4 and 9 wherein the angled reflective mirrors 30 are positioned at inclining angles toward the top of the card 12 adjacent to the linear flowpath 11, and the horizontal mirror 32 is positioned traverse to the linear flowpath 11 of the card 12 underneath it. As noted elsewhere, this arrangement or similar reduces the footprint of the device 10 making employable in limited space areas.

If the reader 19 is employed, data from the magnetic strip 18 and/or data extracted by software form the assembled images of the bar code 20 may also be captured thereby making the data encoded therein immediately available for comparison with captured images of the card 12 in the various spectrums, thereby further providing a concurrent plurality of information for further verification of the authenticity and validity of the ID card 12 itself.

In the scanning or imaging process, to capture segmented images of both sides of the card 12 while traversing in and out of the linear flowpath 11, the device 10 employs a unique imaging technology using LEDs 28 or other spectrum-specific lighting means inside the housing 14 to render images on the imager 16 to capture multiple digital images of both sides of the card 12 in a plurality of light wavelengths. The LEDs 28 shown in FIG. 1 and FIG. 8 mounted on a circuit board 29 are illuminated in a sequence, individually or combined, to thereby illuminate both sides of the card 12 as it travels the linear flowpath 11 in and out of the device 10.

Each time an LED 28 illuminates for a duration, the card 12 so illuminated reflects an image of a segment of the card 12 passing each of a pair of angled reflective mirrors 30. Optionally this segmented illumination may be done by stopping the card 12 for moments during its traverse of the linear flowpath 11 or by a fast sequential strobing of the card 12 while the card 12 moves in and out of the linear flowpath 11.

Since images are captured during both directions of traverse or translation of the card 12 the duration to capture segmented images is doubled over just capturing the images in one direction. Further, because the card 12 is imaged in both directions, should hidden indicia be such that it fluoresces under a certain spectrum of light and continues to glow thereafter for a duration, the LED 28 emitting this spectrum would be employed last, as the card 12 is exiting the housing 14 so that the glowing ink does not damage other images in other spectrums which might be taken after such illumination. The two-way segmented imaging of the card 12 thus is most important in this aspect.

The angled reflective mirrors 30 are each positioned to reflect the segment of the card 12 during any such illumination period of time that the card 12 traverses the linear flowpath 11 through other mirrors and the lens 26 to the imager 16. This enables the device 10 concurrently, in real time, to capture images of both sides of the ID card 12 in a registered position relative to each other, using a plurality of spectrum-specific light sources. Currently a plurality of five different light sources from LEDs 28 adapted to emit light at specific points in the spectrum, are employed; however, others are anticipated within the scope of this application. As noted, the LEDs may strobe quickly singularly or in combination to capture certain images to uncover the hidden indicia on the card 12 while it moves, or the card 12 may be stopped momentarily, according to a preferred method along the linear flowpath 11 to allow for segments under each spectrum of each segment to be captured by the imager 16.

This employment of sequential emissions of light onto the card 12 at different spectrums enables the imager 16 of the device 10 not only to image and store readily viewable informational indicia such as barcode 20 and text 22, but, as noted, also allows the device 10 to image and capture hidden authentication and validation indicia which only illuminates or fluoresces for capture by the imager 16 under certain light spectrums. Inks which either fluoresce after illumination for a period, or reflect light and become viewable under certain light spectrums, are being employed on a widening scale to provide means to authenticate and validate ID's such as licenses. This is currently done by hand by the TSA with drivers' licenses. This ability to capture one or a plurality of such hidden features and store them for comparison or viewing by the user, is therefore a very important aspect provided by the device 10 and method hereon.

As noted, the angled reflective mirrors 30 positioned adjacent to the flowpath 11 of the card 12 will reflect a segment of the card 12 to the imager 16 during each illumination of the card 12 by any one or combination of the spectrum-specific LEDs 28. The entire images of both sides of the card 12 as depicted in FIG. 3 are assembled electronically by a connected data processor and software adapted to the task from the segments stored in memory. The illumination process of each segment of the card 12 as it moves in and along the linear flowpath 11, is accomplished by illuminating the ID card 12 for individual time durations in one or a plurality of light spectrums such as UV (365 nm) Blue (470 nm) Green (525 nm) Red (625 nm) IR (850 nm). Each segmental image in each single or combined light spectrum is reflected to the imager 12 by the aligned mirrors 30 and 32, and through lens 26 which focuses the segments onto the capturing portion of the imager 16. Images can be assembled in five or more wavelengths by strobing the LEDs 28 for short time durations as the card 12 moves past the angled reflective mirrors 30.

Since each ID can have any number of hidden authenticating features that are imageable only under certain light-spectrums, the device 10 allows for multiple ways to capture and employ such authenticating indicia by imaging of the card 12 in at least five spectrums and more when the images captured by the imager 16 and communicated to the data processor are combined electronically to yield assembled images. Because both sides of the card 12 are imaged concurrently for each segmental image, the images of both sides of the card are in registered positions relative to one another. This allows for comparison of the specific positions of indicia points on both sides of the card 12 which is also important since equipment used to forge such documents is frequently inexpensive and unable to accurately position such indicia points to the scale that very sophisticated and expensive printing equipment can. By comparing the points or positions of relative location of specific indicia on both sides of the card 12 the device 10 can provide another means to spot forgeries.

Employing the plurality of LEDs 28 to project individual light spectrums for concurrent or sequential imaging of the card 12, the device illuminates each section imaged, at least in one spectrum and preferably in all available, for short respective time segments. The reflected segmented images of both sides of the ID card 12 then follow the unique optical path to communicate small segmented image portions to the imager 16 for digitizing and communication to a data processor. This unique concurrent reflective path allows for a single imager 16 to be employed to capture both sides of the card image. This is most important to allowing for significantly reduced calibration of the device 10 from conventional scanners.

As can be seen in FIGS. 1-2 and 4 and 6, the LEDs 28 illuminate both sides of the ID card 12 to illuminate the image thereon which is communicated to a pair of angled reflective mirrors 30 relative to the flat side surfaces of the card 12. As can be seen in FIGS. 4 and 6, the two angled reflective mirrors 30 are at substantially a 45-degree angle relative to the card 12 and receive the reflected light from the card 12 and communicate the segment of the image captured by the width of the angled reflective mirrors 30 to a horizontally positioned mirror 32 which is best positioned underneath the circuit board 31 in order to conserve space as best shown in FIGS. 8-9. The axis of the horizontal mirror 32 is substantially normal to the two parallel flat surfaces of the card 12 above or adjacent to the horizontal mirror 32.

The two reflected images of illuminated segments of both sides of the ID card 12, reflected from the angled reflective mirrors 30 onto the horizontal mirror 32, (or lower angled mirrors 33 if employed) are then refracted from the wider reflected image communication 21 shown in FIG. 6, through a lens 26 which yields a narrower projection 23 of the segmental images of both sides of the card 12, onto the linear narrow imaging area 15 of the electronic imager 16 for conversion to digital image format and storage in onboard memory.

Software adapted to the task, onboard or networked to the device 10, can be employed to ascertain optical character recognition of the text 22, electronic information in the magnetic strip 18, and stored in the bar code 20, and electronically assemble individual images on each side of the card 12 in the different light wavelengths sequentially emitted by the LEDs 28, to ascertain the presence of required validation or authenticating indicia or markings on the card 12 and to compare it with the electronic information stored in the bar code 20 and magnetic strip 18. Those skilled in the art will realize that software may be adapted to the task to look for any number of individual identifiers provided by the visible and spectrum-illuminated images so assembled and the device 10 itself may allow for a great increase in intricate authentication and validation schemes that may be employable using both visible and spectrum-specific indicia.

Employing the various assembled images of both normal-light visible and spectrum-specific visible indicia, those images may be compared and inspected using software or the human eye on occasions if the images are simply projected onto a screen to ascertain the authenticity and validity of the driver's license or other ID card 12, and also to ascertain if the holder is sought for any reason by authorities.

As can be seen in FIG. 9, the novel arrangement of the reflective pair of angled reflective mirrors 30 to a horizontal mirror 32 below the linear flowpath 11 of the ID card 12, allows for a very small footprint for the device 10. Using the plurality of light-emitting means and other means to read printed and electronic information on the ID card 12, in concurrently assembled images of segments, allows for authentication of the ID card quickly and easily.

FIGS. 11A, 11B, 11C, 12, and 13 depict another embodiment of the device 10 incorporating front flowpath access 110 and rear flowpath access 111 at each end of the flowpath 11.

Figure 12:
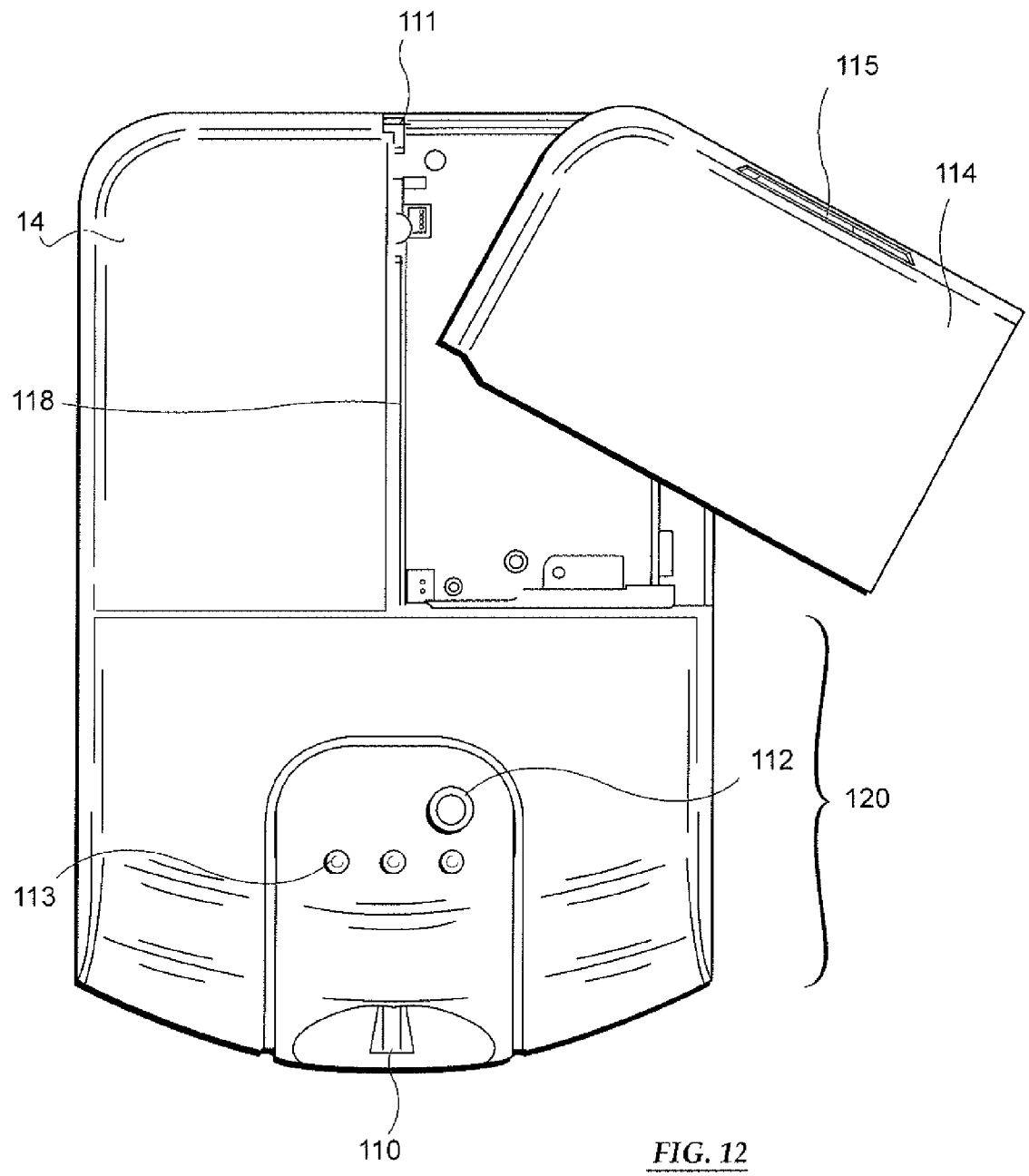
FIG. 12 depicts an exemplary illustrative view of the ID Scanner with the access panel in its partially open state.

A user could insert or retrieve a card 12 from either the front flowpath access 110 or rear flowpath access 111. This embodiment further incorporates an access door 114, to access the interior of the device 10 that is usually protected and enclosed by housing 14. Access door 114 can move from a closed state as in FIG. 11C to an open state as depicted in FIG. 12 by pulling access trigger 115. In the figure, the access door rotates about a point near the rear of housing 14, but the access door could rotate in any direction, could slide in any direction, or could even be entirely removed from housing 14 without departing from the spirit of the invention. The access door 114 can also hold additional functional elements that move along with the access door 114. In one embodiment, the distance between the front flowpath access 110 and the closest accessible point along the flowpath 11 when the access door 114 is in an open state is called the sensor array area 120 because it is where most of the active scanning occurs and contains devices that could be sensitive to user touch such as LEDs 28, lenses 26, and mirrors 30. Sensor array area 120 is not made accessible to the user when access door 114 opens, but the length of flowpath 11 through sensor array area 120 is less than the width of card 12 to be scanned by device 10. By limiting the dimensions in this way, a user can always touch and retrieve the card 12, even if device 10 loses power or stops functioning for any reason. In this embodiment, sensitive elements can be protected by either locating those sensitive elements in regions of the device 10 that do not become accessible when access door 114 is opened or can retract further into the device when not actively used or when access door 114 opens. For example, an electromechanical solenoid 119 extends and retracts magnetic strip reader 19. This embodiment also incorporates a button 112 (FIG. 13) to initiate an immediate card extraction routine illustrated in FIG. 16 and a series of lights (optionally LEDs) 113 to inform the user of device status. This embodiment further optionally incorporates ports for both power 116 and data transfer 117.

Figure 13:
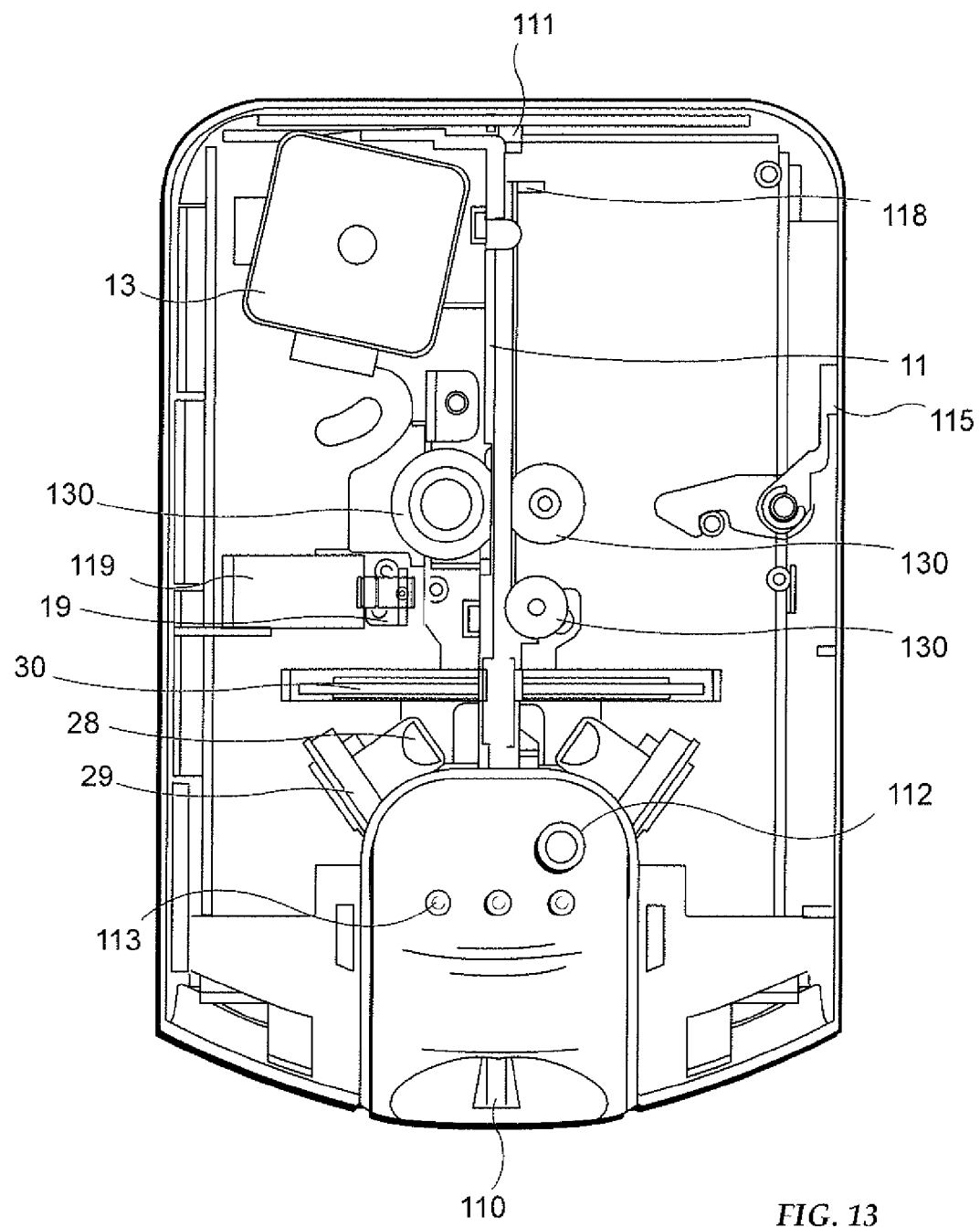
FIG. 13 depicts the interior of the ID Scanner, revealing internal components.

Turning to FIG. 13, housing 14 has been removed to reveal the interior of device 10. Motor 13 drives a belt (shown as 17 in FIG. 8) that in turn drives a number of wheels 130, which hold and advance card 12 in either direction along flowpath 11. The wheels 130 are spaced along the flowpath 11 in a way that a card in the flowpath 11 will always be in contact with at least one wheel. In addition to advancing card 12 forward or backward, wheels 130 apply lateral pressure on card 12, allowing magnetic strip reader 19 to surface-read magnetic strip 18. Vertical pressure bar 118 applies downward pressure to help align card 12 from above flowpath 11 without interfering with the scanning mechanisms (retractable magnetic strip reader 19 and electronic imager 16). Vertical pressure bar 118 also forces card 12 to sit level in flowpath 11, so between the guidance of the flowpath 11, the downward pressure from vertical pressure bar 118, and the wheels 130, the card is maintained at an optimal position and angle for scanning.

Figure 14:
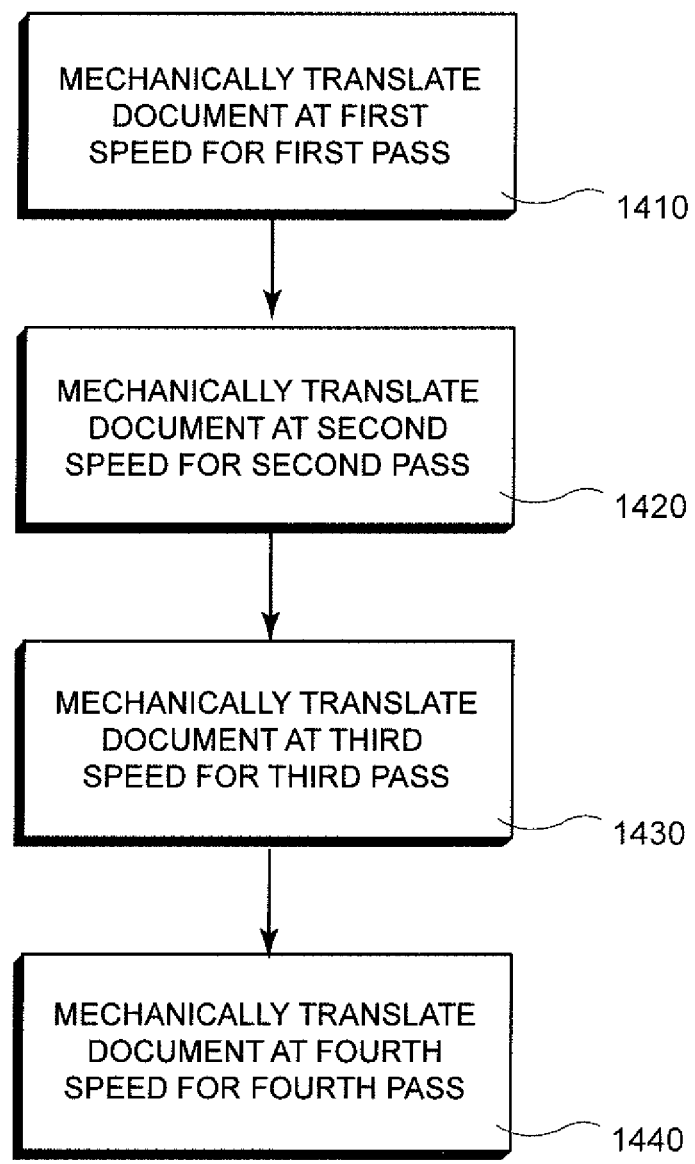
FIG. 14 depicts a flow chart of document movement during a multiple-pass scan utilizing the device.
Figure 15:
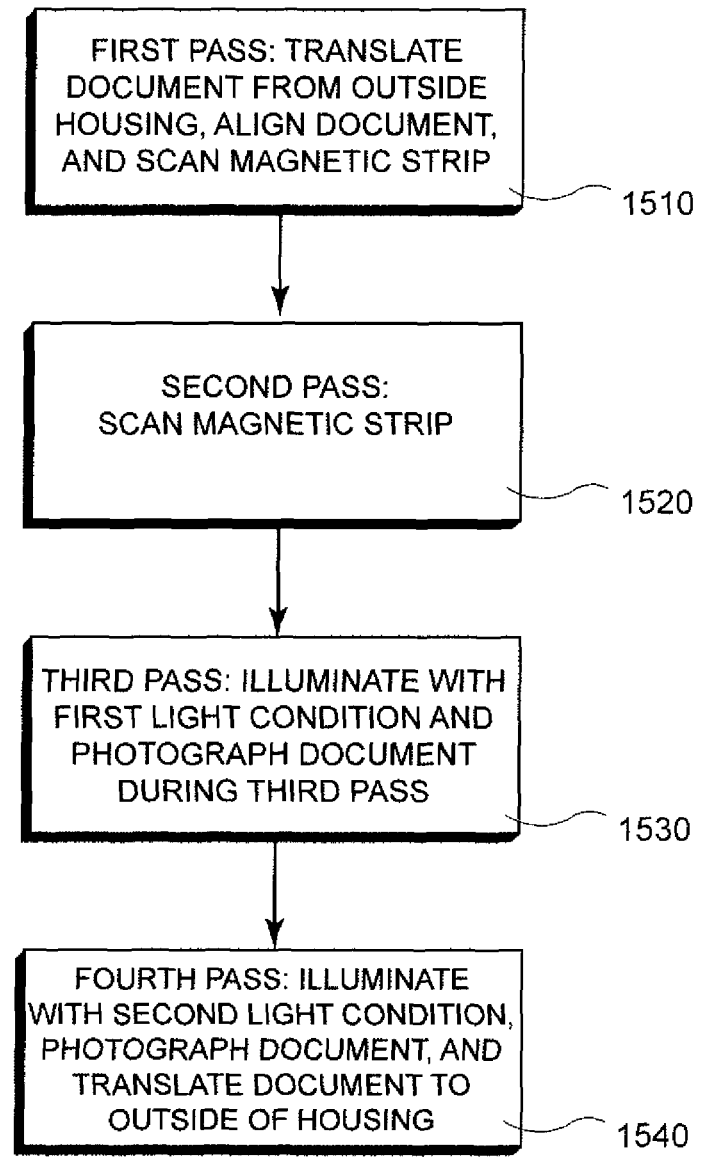
FIG. 15 depicts a flow chart of actual device steps performed during each pass of FIG. 14.

The fine card position and motor 13 control described above allow for multiple precision document movements and an optimized scanning process, as described in FIGS. 14 and 15. In one preferred process, the system can align the document (which could be card 12 from previous examples, though the process is not limited to cards or IDs) while translating 1410 the document along flowpath 11 from outside housing 14 through front flowpath access 110 toward rear flowpath access 111 (herein referring to this direction as forward and the opposite direction as backward) at a first speed optimized for a first magnetic strip scan 1510. Motor 13 can then reverse the document's motion and translate the document backward 1420 at a second speed optimized for a second magnetic strip scan 1520. By utilizing multiple magnetic strip scans, the device can recognize if either scan was incomplete and could even merge valid portions from each magnetic scan to assemble a complete virtual third scan. After performing both magnetic scan steps in first pass 1510 and second pass 1520, device 10 could retract magnetic strip reader 19 from a first position where magnetic strip reader 19 is active as a contact scanner to a second position where magnetic strip reader 19 will not interfere with document movement during subsequent phases. Between first pass 1510 and third pass 1530, the document can be maintained entirely within the flowpath 11 without any portion of the document passing through front flowpath access 110 to the exterior of housing 14 to avoid user interference. Alternatively, the document can partially exit front flowpath access 110 to the exterior of housing 14 to diminish device dimensions.

Additionally, preliminary scans of the document 12 can be performed during the high speed first or second passes. Because of the high speed, traditional imaging is not possible without increasing component expense, but other valuable measurements can be performed. By illuminating LEDs 28 on only one side of the document, the document scanner 10 can analyze the image captured to quickly determine the height of the document, the width of the document, and the amount of light that bleeds through the document which may assist with later image correction. Document 12 height can be determined through simple calculation from observing what portion of the vertical light is obscured. Document width can be determined because the speed of the document is known and controlled. The document scanner can measure the time the document first obscures light to the time light is no longer obscured and calculate that from the known velocity. Document width could also be determined by counting the number of times a wheel spins from one end of the document to the opposite end. During this preliminary scan, the document can also be weighed and the width of the document can be determined. Document thickness can be determined by closing a simple caliper on the document at any time during the scan. Other simple known measurements can be performed as part of the preliminary scan.

Device 10 could then mechanically translate document forward at a third speed for a third pass 1430. During third pass 1430, the document could be illuminated with a first light condition and photographed as in step 1530. Finally device 10 can mechanically translate document backward at a fourth speed for a fourth pass 1440. During fourth pass 1440, the document can be illuminated with a second light condition and photographed again before being translated outside of the casing through front flowpath 11 access 110 as in step 1540. The first and second light conditions could be a specific frequency of light, an alternation of multiple specific frequencies, or any other combination of simultaneous light frequencies. The device is not limited to only 4 passes, and the different speeds could actually be the same speed. The lowest operable magnetic strip reader speed only slightly overlaps the highest allowable speed for electronic imaging without investing in more expensive high-speed CCDs and image processors, so it is likely that the device 10 will utilize higher speeds during magnetic strip reading passes than during photographing passes.

Figure 16:
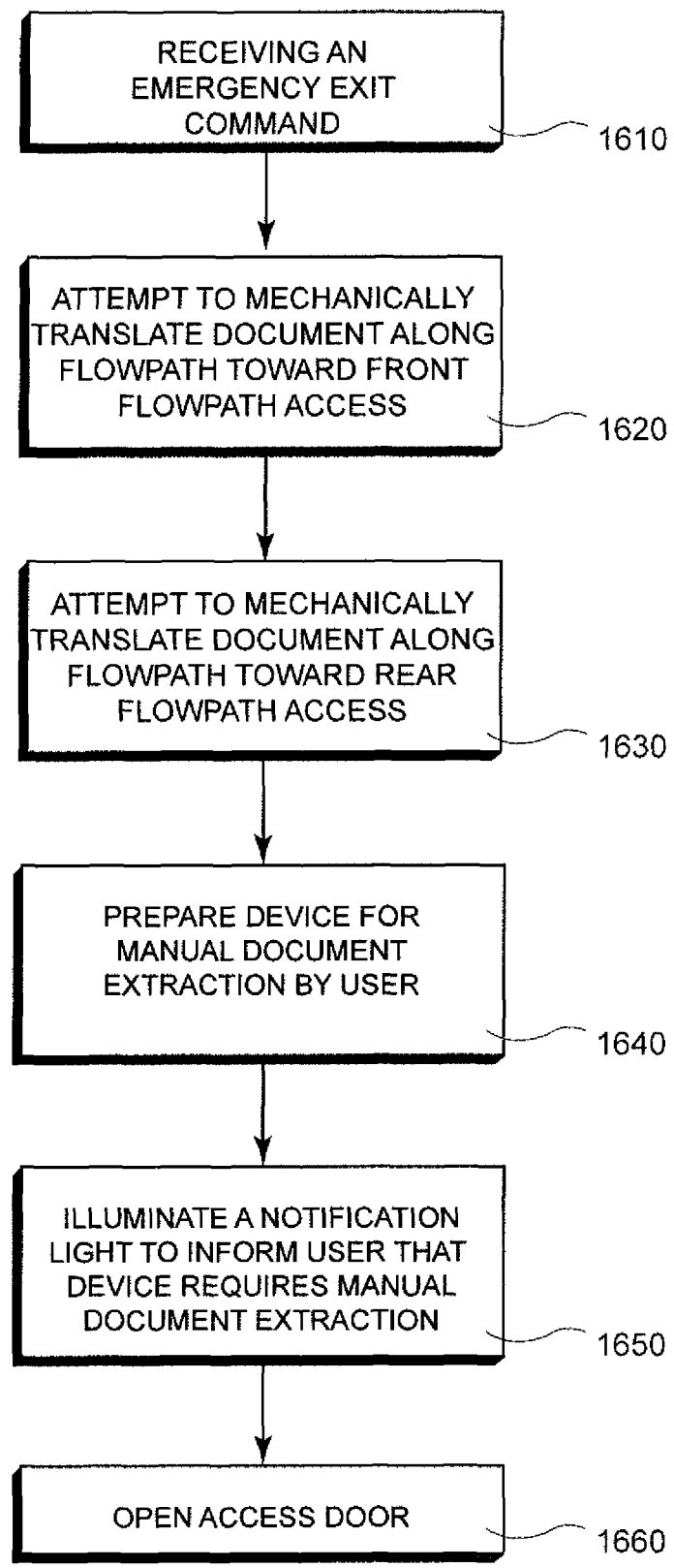
FIG. 16 depicts an emergency retrieval process for immediately retrieving a document from the device.

Turning to FIG. 16, device 10 incorporates an exit-now or emergency document extraction command function. Upon receipt 1610 of an emergency exit command (either from a user pressing button 112 or from some internal sensor), device 10 can attempt to mechanically translate 1620 the document toward the front flowpath access (backward). If that fails, device 10 can attempt to mechanically translate 1630 the document toward the rear flowpath access (forward). Either of these mechanical translation attempts can incorporate an intermittent or jittered motion to attempt to loosen any jam. Additionally or alternatively, these translations could be attempted at a lower speed to utilize a greater torque or a higher speed to attempt to skip over any impediment. If neither forward nor backward translation has successfully ejected the document 12, device 10 can prepare 1640 for manual document extraction by the user. Manual document extraction preparation 1640 could include retracting magnetic strip reader 19, wheels 130, lifting vertical pressure bar 118, and cutting electricity to some or all internal devices to eliminate the risk of user shock during extracting the document. Instrument retraction could occur either before or after backward translation 1620 and forward translation 1630. Once device 10 has completed manual document extraction preparation 1640, the device could optionally illuminate 1650 a notification light or play a notification sound to alert a user that the document will require manual document extraction and that device 10 is now safe for manual extraction. At this point, document retrieval will require the access door 114 to open 1660. The access door can be opened manually by utilizing trigger 115 or automatically via some internal command to disengage the latch that secures access door 114. When access door 114 opens, the user will have access to flowpath 11, excluding that portion of flowpath 11 enclosed within sensor array area 120 (in this embodiment). Because the portion of flowpath 11 enclosed by sensor array area 120 is shorter than the width of the document to be scanned (card 12 in one embodiment), a user can always touch and retrieve the document manually from either the front flowpath access 110 or from the portion of flowpath 11 exposed when access door 114 is opened. In other embodiments, the entirety of flowpath 11 including that portion enclosed by sensor array area 120 is accessible when access door 114 is opened. After retrieving a document, the user can close access door 114, at which point device 10 can return to its active state, which may include powering up the device, running a brief system check, and extending previously retracted elements such as the magnetic strip reader 19, the wheels 130, the LEDs 28, and the vertical pressure bar 118.

While many of the fundamental characteristics and features of the ID scanner and its processes have been described herein, with reference to particular embodiments thereof, a latitude of modification, various changes and substitutions are intended in the foregoing disclosure, and it should be apparent that in some instances some features of the invention will be employed without a corresponding use of other features without departing from the scope of the invention as set forth. It should be understood that such substitutions, modifications, and variations may be made by those skilled in the art without departing from the spirit or scope of the invention. Consequently, all such modifications and variations are included within the scope of the invention as defined herein.

What is claimed is:

1. A document scanner for extracting identifying information comprising: a defined path in which a document can be mechanically translated, said defined path having a first opening in an external housing and a second opening in said external housing opposite said first opening; a sensor array area enclosing a portion of said defined path; a motor or actuator capable of mechanically translating a document both in a first direction along said defined path and in a second direction opposite to said first direction along said defined path; a pair of angled reflective mirrors, said each angled reflective mirror positioned to reflect a segment of said document; an access door in said external housing that opens to allow access to a document inside of said external housing; and a processor in communication with a memory, said processor capable of executing an automated document extraction process, said automated document extraction process comprising: receiving an emergency exit command; instructing said motor or actuator to mechanically translate said document along said defined path toward said first opening; instructing said motor or actuator to mechanically translate said document in a reverse direction along said defined path toward said second opening; and preparing said document scanner for manual document extraction by a user.

2. The document scanner of claim 1, further comprising:
   a digital camera comprising a lens and a sensor array for acquiring at least one image of a side surface of said document;
   and a magnetic strip reader.

3. The document scanner of claim 1 comprising the document extraction process, said preparing said document scanner for manual document extraction including illuminating a notification light that manual document extraction is required.

4. The document scanner of claim 1, wherein said sensor array includes at least one retractable element and said preparing said document scanner for manual document extraction includes retracting said at least one retractable element.

5. The document scanner of claim 1, said access door including a manual release access trigger.

6. The document scanner of claim 1, said preparing said document scanner for manual extraction by a user including reducing power supplied to internal components.

7. The document scanner of claim 1, said preparation for manual document extraction including automatically opening said access door.

8. The document scanner of claim 1, wherein said portion of said defined path enclosed by said sensor array area is no longer than the length of the document to be scanned.

9. The document scanner of claim 1 comprising said automated document extraction process, wherein the instructing said motor or actuator to mechanically translate said document along said defined path toward said first opening comprises mechanically translating at an intermittent rate.

10. The document scanner of claim 1 comprising said automated document extraction process wherein the instructing said motor or actuator to mechanically translate said document along said defined path toward said first opening comprises mechanically translating at a reduced speed.

11. The document scanner of claim 1, further comprising a button that sends said emergency exit command.

12. The document scanner of claim 1, further comprising a sensor capable of automatically sending said emergency exit command if the document is jammed.

13. The document scanner of claim 1 further comprising:
   a secondary mirror portioned transverse to said document and said defined path, said secondary mirror having an angle adapted to intersect reflections from both of said pair of mirrors and communicate them to said lens of said digital camera.

14. An automated method for extracting a document from a duplex document scanner employing a single sensor comprising: receiving an emergency exit command; attempting to mechanically translate a document in a first direction along a defined path inside of an external housing toward a first access point; attempting to mechanically translate a document in a second direction opposite said first direction along said defined path inside of an external housing toward a second access point; preparing said document scanner for manual document extraction by a user; and illuminating a light that informs the user said document scanner was not capable of manually extracting said document.

15. The method of claim 14 further comprising receiving a notification that a document somewhere along said defined path requires extraction from said document scanner.

16. The method of claim 14, said attempting to mechanically translate a document including attempting to mechanically translate a document at an intermittent rate.

17. The method of claim 14, said attempting to mechanically translate a document including attempting to mechanically translate a document at a reduced speed.

18. The method of claim 14 further comprising retracting a retractable element configured to the document.

19. A document scanner for extracting identifying information comprising: a defined path in which a document can be mechanically translated, said defined path having a first opening in an external housing and a second opening in said external housing opposite said first opening; a sensor array area enclosing a portion of said defined path, said portion of said defined path enclosed by said sensor array area is no longer than the horizontal length of the document to be scanned; a motor or actuator capable of mechanically translating a document both in a first direction along said defined path and in a second direction opposite to said first direction along said defined path; a pair of angled reflective minors, said each angled reflective mirror positioned to reflect a segment of said document; an access door in said external housing that opens to allow access to a document inside of said external housing, said access door including a manual release access trigger; a digital camera comprising a lens and a sensor array for acquiring at least one image of a side surface of said document; a magnetic strip reader; and a processor in communication with a memory, said processor capable of executing an automated document extraction process, said automated document extraction process comprising: receiving an emergency exit command; instructing said motor or actuator to mechanically translate said document along said defined path toward said first opening; instructing said motor or actuator to mechanically translate said document in a reverse direction along said defined path toward said second opening; and preparing said document scanner for manual document extraction by a user.

20. The document scanner of claim 19 further comprising:
a secondary mirror portioned transverse to said document and said defined path, said secondary mirror having an angle adapted to intersect reflections from both of said pair of mirrors and communicate them to said lens of said digital camera.

* * * * *